US011148883B2

(12) United States Patent
Yoshitake et al.

(10) Patent No.: US 11,148,883 B2
(45) Date of Patent: Oct. 19, 2021

(54) ARTICLE CARRIER SYSTEM, ORDER MANAGEMENT DEVICE, AND CONTROL METHOD FOR ARTICLE CARRIER SYSTEM

(71) Applicant: Hitachi Transport System, Ltd., Tokyo (JP)

(72) Inventors: Hiroshi Yoshitake, Tokyo (JP); Ryota Kamoshida, Tokyo (JP); Junichi Kimura, Tokyo (JP); Emi Takahashi, Tokyo (JP)

(73) Assignee: Hitachi Transport System, Ltd., Tokyo (JP)

( * ) Notice: Subject to any disclaimer, the term of this patent is extended or adjusted under 35 U.S.C. 154(b) by 301 days.

(21) Appl. No.: 16/410,184

(22) Filed: May 13, 2019

(65) Prior Publication Data
US 2019/0367276 A1    Dec. 5, 2019

(30) Foreign Application Priority Data
May 29, 2018  (JP) .............................. JP2018-102553

(51) Int. Cl.
*B65G 1/137*  (2006.01)
(52) U.S. Cl.
CPC ................... *B65G 1/1373* (2013.01)
(58) Field of Classification Search
CPC ................................................... B65G 1/1373
See application file for complete search history.

(56) References Cited

U.S. PATENT DOCUMENTS

| | | | | |
|---|---|---|---|---|
| 5,475,604 A | * | 12/1995 | Nagamatsu .......... | B65G 1/1371 414/788.9 |
| 8,483,869 B2 | * | 7/2013 | Wurman ................... | G06F 7/00 700/216 |
| 8,626,335 B2 | * | 1/2014 | Wurman .............. | B65G 1/1373 700/216 |
| 8,972,042 B2 | * | 3/2015 | Uribe ................... | B65G 1/1373 700/216 |
| 2009/0185884 A1 | * | 7/2009 | Wurman .............. | B65G 1/1373 414/270 |
| 2014/0107833 A1 | * | 4/2014 | Segawa ................ | G06Q 10/083 700/214 |
| 2015/0057792 A1 | * | 2/2015 | Zhang .................... | A47B 63/06 700/214 |
| 2017/0158430 A1 | * | 6/2017 | Raizer .................... | B65G 1/137 |
| 2017/0313516 A1 | * | 11/2017 | Kazama ................ | B65G 1/137 |

FOREIGN PATENT DOCUMENTS

WO    WO 2007/011814 A2    1/2007

* cited by examiner

*Primary Examiner* — Michael Collins
(74) *Attorney, Agent, or Firm* — Crowell & Moring LLP

(57) ABSTRACT

An article carrier system has a plurality of storage shelves and an order management unit. In the storage shelves, articles are stored. The order management unit manages a plurality of orders for shipping orders, holds receptacle information including at least information regarding a quantity of articles stored in each receptacle of each of the storage shelves, determines to provide different conditions for orders for performing picking at different workplaces, as conditions for correlating between each order and the receptacle for performing the picking in accordance with each order, and determines a storage shelf to be carried to the workplace for performing the picking in association with each order, based on the determined conditions and receptacle information.

11 Claims, 10 Drawing Sheets

FIG. 5

SHIPPING ORDER

| | ARTICLE | NUMBER OF ARTICLES | DELIVERY DESTINATION | | ARTICLE | NUMBER OF ARTICLES | DELIVERY DESTINATION | |
|---|---|---|---|---|---|---|---|---|
| 511 | A | 10 | SH1 | 517 | C | 15 | SH5 | |
| 512 | B | 20 | SH1 | 518 | E | 10 | SH6 | |
| 513 | A | 15 | SH2 | 519 | F | 5 | SH1 | |
| 514 | C | 5 | SH3 | 520 | G | 5 | SH7 | |
| 515 | D | 5 | SH4 | 521 | H | 5 | SH8 | |
| 516 | B | 10 | SH5 | | ... | | | |

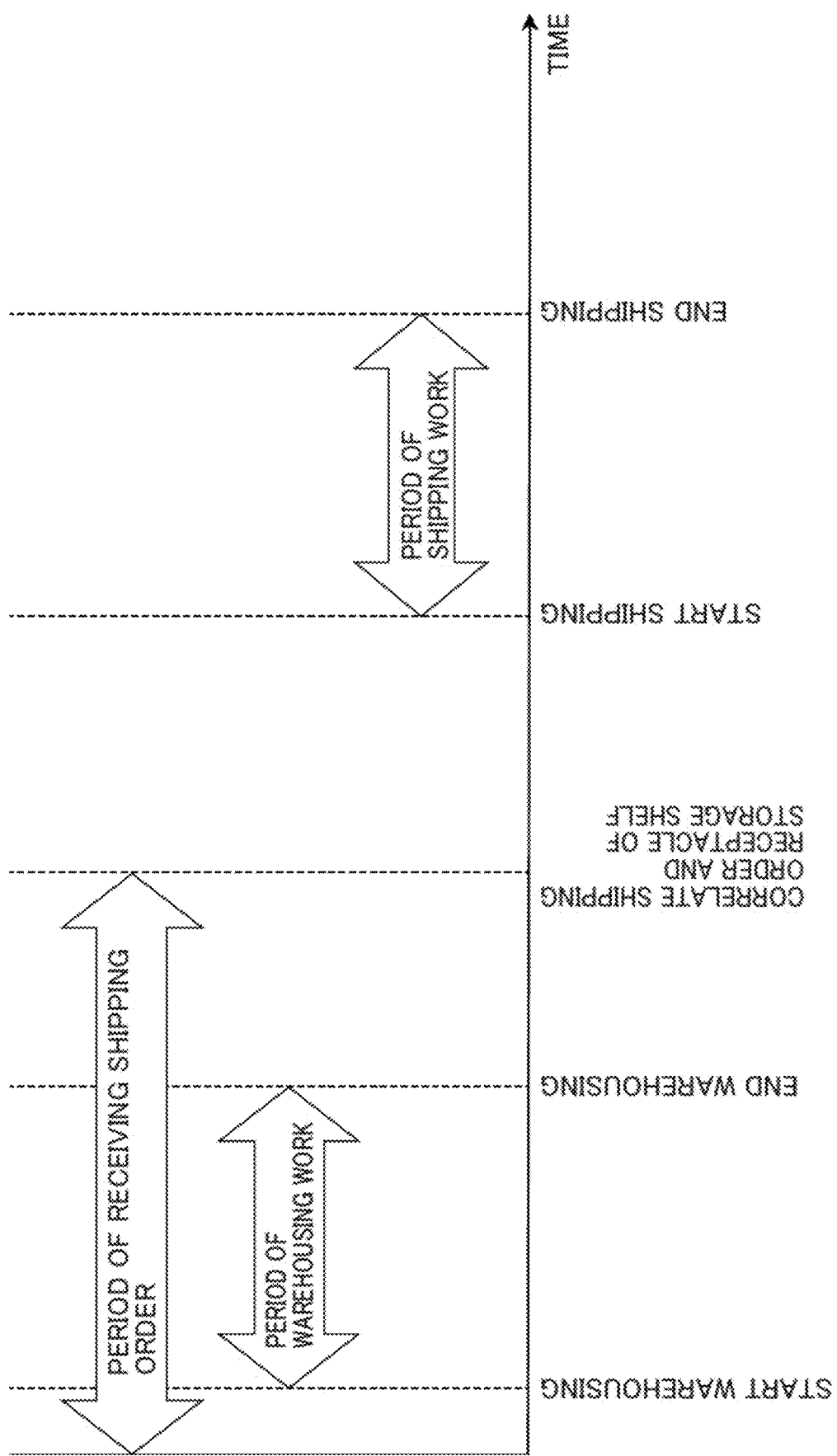

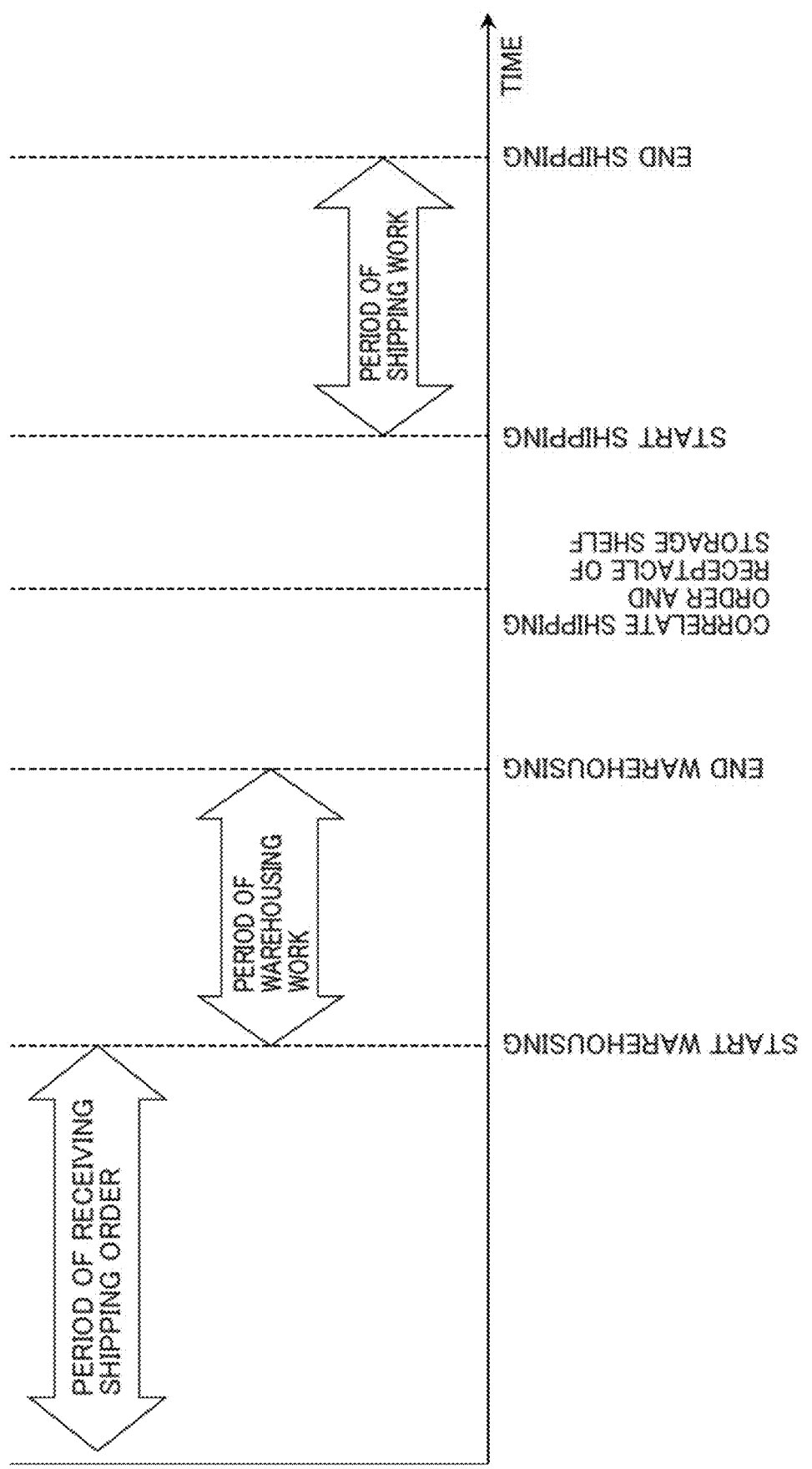

FIG. 8A
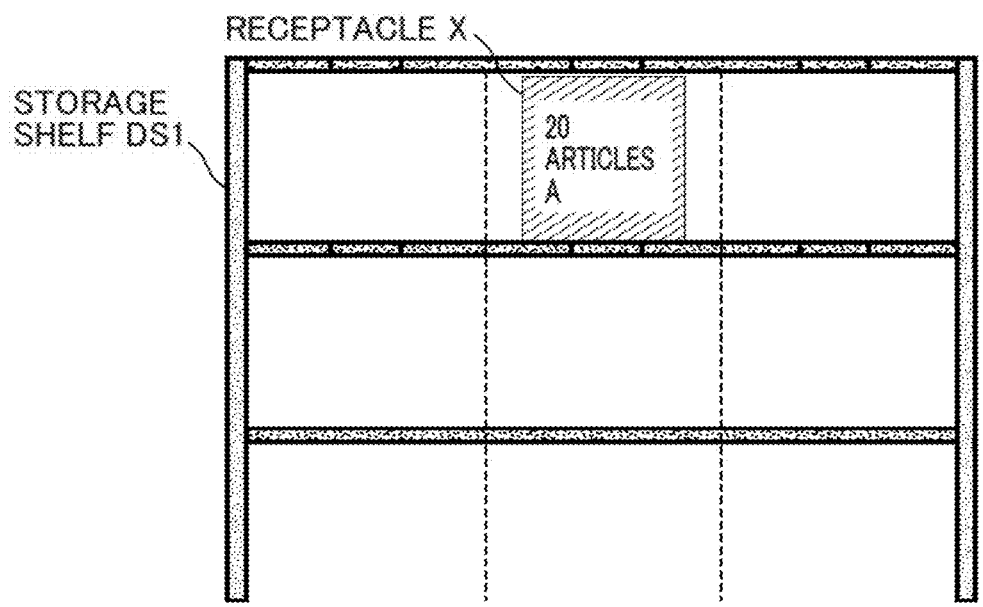
FIG. 8B
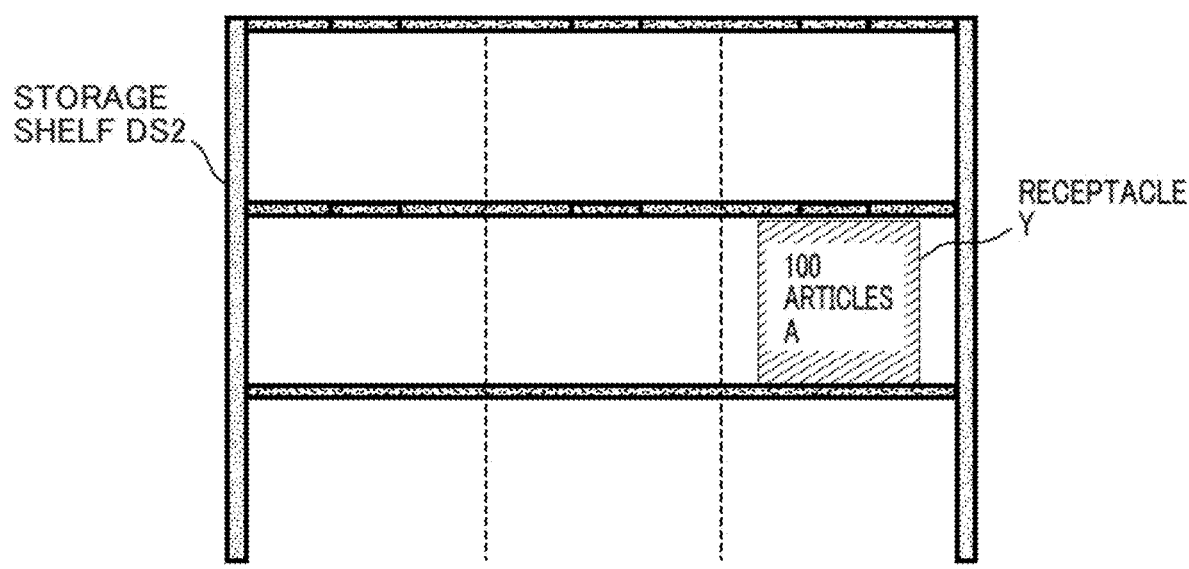
FIG. 8C
SHIPPING ORDER
| ID | ARTICLE | NUMBER OF ARTICLES | DELIVERY DESTINATION | |
|---|---|---|---|---|
| ODR001 | A | 10 | SH1 | ~511 |
| ODR002 | A | 15 | SH2 | ~513 |

ARTICLE CARRIER SYSTEM, ORDER MANAGEMENT DEVICE, AND CONTROL METHOD FOR ARTICLE CARRIER SYSTEM

CLAIM OF PRIORITY

The present application claims priority from Japanese patent application JP 2018-102553 filed on May 29, 2018, the content of which is hereby incorporated by reference into this application.

BACKGROUND

The present invention relates to a technique for controlling an article carrier system for carrying articles in a warehouse or factory.

In a distribution warehouse or factory, workers perform work for collecting storage articles in accordance with shipping orders and sorting them to shipment destinations, that is, picking work. An example of the operated picking work is a picking system in which an automatic carrier carries storage articles.

International Publication WO2007/011814 discloses a technique for performing the picking by carrying a target article of a shipping order or a storage shelf having a target article stored therein, to the place of the worker, with using the automatic carrier in the distribution warehouse. When to carry a storage shelf to the place of the worker, the automatic carrier creeps under the storage shelf to be carried. Then, the automatic carrier holds up the lowest tread of the storage shelf, thereby lifting up the entire storage shelf and carrying it in a state where the legs of the shelf are lifted. The worker waits for arrival of the storage shelf at a picking station where the articles are picked up. After the storage shelf arrives at the picking station, the worker picks up the article of an item described in the shipping order, and throws a specified quantity of articles to positions corresponding to the shipment destinations in accordance with the shipping order, in receptacles or small boxes sorted in association with shipment destinations, thereby carrying out picking work for each shipping order. The storage shelf in which the picking work has been completed is carried out from the picking station again by the automatic carrier.

SUMMARY

To carry the storage shelf having articles corresponding to the shipping order to the picking station by the automatic carrier, it is necessary to determine the shipping order and the receptacle of the storage shelf for performing the picking in advance. When a plurality of receptacles in a plurality of storage shelves contain the same kind of articles, it is possible to uniquely determine the receptacles of the storage shelf without choice, by determining the order of the receptacles in the storage shelf in correlation with the shipping orders, in advance. However, this method for determining the shipping orders in correlation with the receptacles of the storage shelf has the following problems.

When correlating between the shipping order and the receptacle in the storage shelf based on the same order condition, even if the same kind of articles exist in different receptacles of the plurality of storage shelves, the high priority order is likely to be given to the same receptacle of the same storage shelf. Thus, even in the shipping orders in which picking is carried out at different picking stations, the shipping order corresponding to the same kind of products is more likely to require the same storage shelf. In this case, there occurs a scramble for the storage shelf between the picking stations. Until completion of the picking from the storage shelf, as a factor of the scramble at one picking station, there occurs a wait time until carrying out the picking at another picking station requiring the same storage shelf. This results in decreasing the throughput of the entire system. The throughput is, for example, the number of shipping orders with completed pickings per unit time, totally at the entire picking stations being operated.

When there are a plurality of storage shelves containing the same products, it is desired to correlate the receptacles of different storage shelves, for the shipping orders regarding a particular kind of articles, at different picking stations. This enables to carry out the picking for the same kind of articles parallelly at a plurality of picking stations, and results in preferable throughput of the entire system.

The present invention has been made in consideration of the background, and the present invention is to improve the throughput of the article picking work, in a picking system including a storage shelf for articles, a carrier device which can move the storage shelf, a controller for the carrier device, and an order management device managing the shipping orders.

To solve at least one of the above problems, according to the present invention, there is provided an article carrier system having: storage shelves in which an article is stored; and an order management unit which manages orders for shipping the article. The order management unit holds receptacle information which includes at least information representing a quantity of articles stored in each receptacle of each of the storage shelves, determines to provide different conditions for orders for which picking is performed at different workplaces, as conditions for correlating between each of the orders and the receptacle for performing picking in accordance with each order, and determines a storage shelf to be carried to the workplace for performing the picking in association with each of the orders, based on the determined condition and the receptacle information.

Any other means for solving them are appropriately described in the preferred embodiment.

According to an embodiment of the present invention, is it possible to reduce a wait time generated due to a scramble for the same storage shelf at different picking stations, and to improve the throughput of the picking work of the system in accordance with the shipping orders.

Any problems, configurations, and effects other than the above will be apparent from the following descriptions of the preferred embodiment.

BRIEF DESCRIPTION OF THE DRAWINGS

FIG. 5 is an explanatory diagram illustrating an example of description contents of shipping orders received from shipment destinations by a WMS, according to the embodiment of the present invention;

FIG. 6 is an explanatory diagram illustrating a work sequence example of warehousing and shipping of articles, when the article carrier system is applied to a distribution warehouse, according to the embodiment of the present invention;

FIG. 7 is an explanatory diagram illustrating a work sequence example of warehousing and shipping of articles, when the article carrier system is applied to a distribution warehouse, according to the embodiment of the present invention;

FIGS. 8A to 8C are explanatory diagrams illustrating examples of warehousing states and shipping orders of the same products for different two storage shelves, in the embodiment of the present invention;

DETAILED DESCRIPTION

An embodiment (referred to as a preferred embodiment) of the present invention will now specifically be described appropriately by reference to the accompanying drawings.

Figure 1:
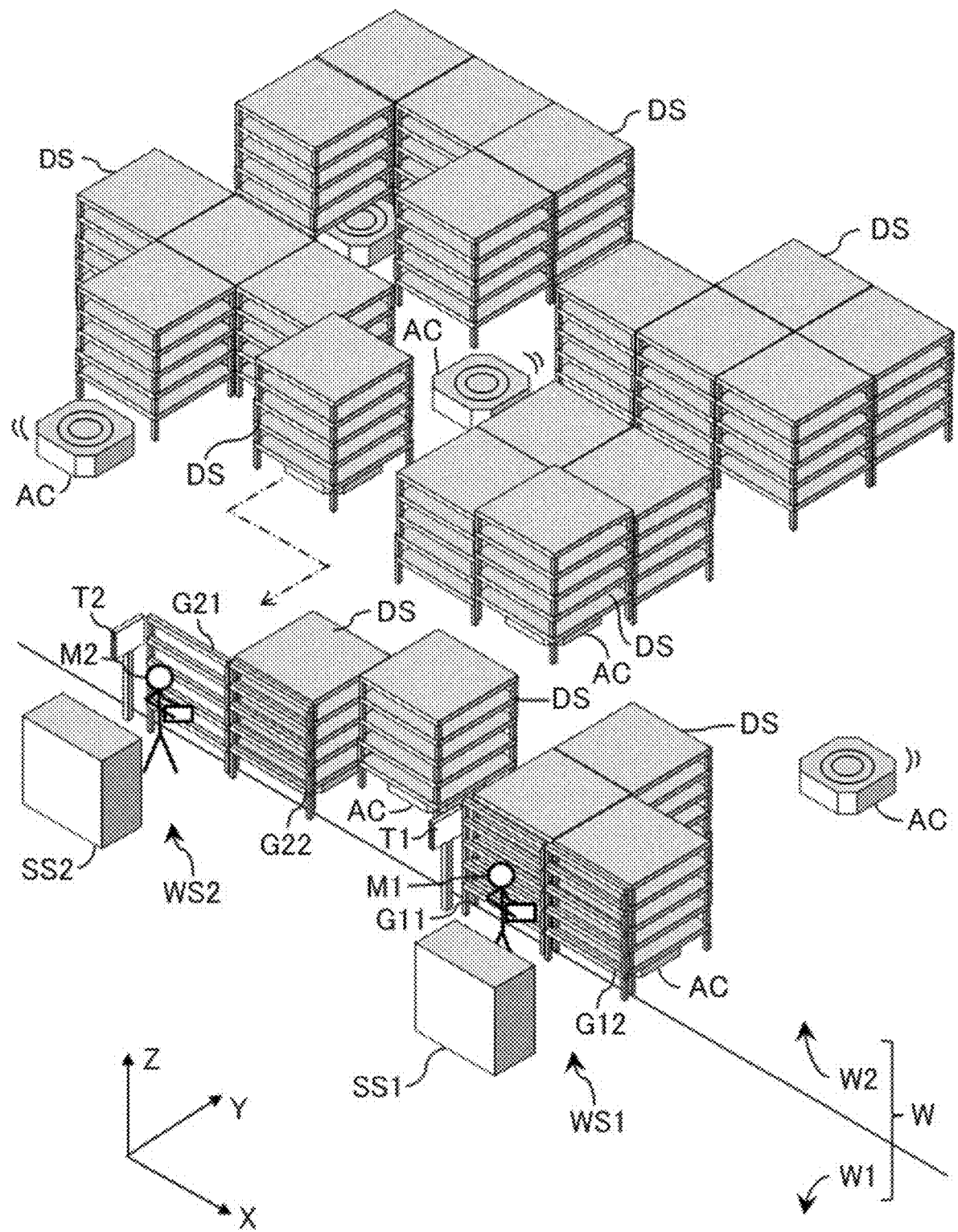
FIG. 1 is an entire schematic diagram of a carrier system according to an embodiment of the present invention.

FIG. 1 is an entire schematic diagram of a carrier system according to the preferred embodiment of the present invention.

A warehouse W has a work area W1 and a storage area W2 of articles. In the storage area W2, a plurality of storage shelves DS are arranged. Each of the storage shelves DS contains one or more kinds of articles. In the storage area W2, a plurality of automatic carriers AC exist. The automatic carriers AC have a function for carrying the storage shelves DS.

The floor surface of the storage area W2 is divided, for example, in a two-dimensional lattice form. A WMS 401 and an operation management device 403 as will be illustrated later in FIG. 3 manage positions of automatic carriers AC and storage shelves DS, based on coordinate values of the center of each lattice (that is, a rectangular section). This management may be performed based on the coordinate values of the apex, instead of the coordinate values of the center of the lattice. Each lattice has the coordinate marker including the coordinate values of the corresponding lattice. The coordinate marker is, for example, a bar code (including a two-dimensional code) adhered or applied onto the lattice. The bar code is information including coordinate values of the lattice.

In the work area W1, there exist a plurality of work stations WSi including symbols WS1 and WS2. In this embodiment, in the work station WSi, the picking work is performed, the work station may be referred to as a picking station. In this case, "i" represents the number of work stations WS, and is an integer satisfying that $1 \leq i \leq n$. "n" is an integer equal to or greater than 2, and indicates the total number of work stations WS. In this example, n=2.

When there is no need to distinguish between the work stations WSi, for example, when descriptions will commonly be made to the work stations WSi, it is generally referred to as the work station WS. The work station WSi has a gate Gij, a terminal Ti, and a sorting shelf SSi. In this case, "i" represents the number of work stations WS. "j" of the gate Gij is an integer satisfying that $1 \leq j \leq m$, and represents the number of gates G provided in each work station WS. In this embodiment, m=2.

That is, in each work station WSi, one terminal Ti, a sorting shelf SSi, and an m-number of gates G are provided. When there is no distinguishment between the individual gates Gij, the terminals Ti, and the sorting shelves SSi, they are referred to appropriately as the gate G, the gate Gij, the terminal T, the terminal Ti, the sorting shelf SS, or the sorting shelf SSi. The gate Gij is an arrival point of the storage shelf DS. One gate Gij corresponds to one storage shelf DS. A list of distribution destinations of articles (corresponding information regarding the articles and sorting shelf sections of the sorting shelves SSi in association with each other) is displayed on the terminal Ti.

The sorting shelf SSi included in the work station WSi is a shelf in which articles picked up from the storage shelf DS through the gate Gij are provided. In this case, "i" of a worker Mi represents the number of work stations WS, and is an integer satisfying that $1 \leq i \leq n$. "n" is an integer equal to or greater than 2, and represents the total number of the work stations WS. In this embodiment, n=2. When there is no distinguishment of the workers Mi, they are appropriately referred to as a worker M or a worker Mi.

The automatic carrier AC carries the storage shelf DS. First, the automatic carrier AC moves to the position of the specified storage shelf DS. The automatic carrier AC creeps right under the specified storage shelf DS. Upon reception of lift-up specification information from the operation management device 403 illustrated in FIG. 3, it lifts up the storage shelf DS using a non-illustrative jack mechanism provided on the upper surface of the automatic carrier AC. After this, the automatic carrier AC moves to a specified work station WS in the work area W1, while holding up the storage shelf DS. When the automatic carrier AC arrives at the work station WS, it drops off the storage shelf DS on the floor. If the picking work by the worker M is completed, the automatic carrier AC lifts up the storage shelf DS again, and returns it to the original position.

Figure 2:
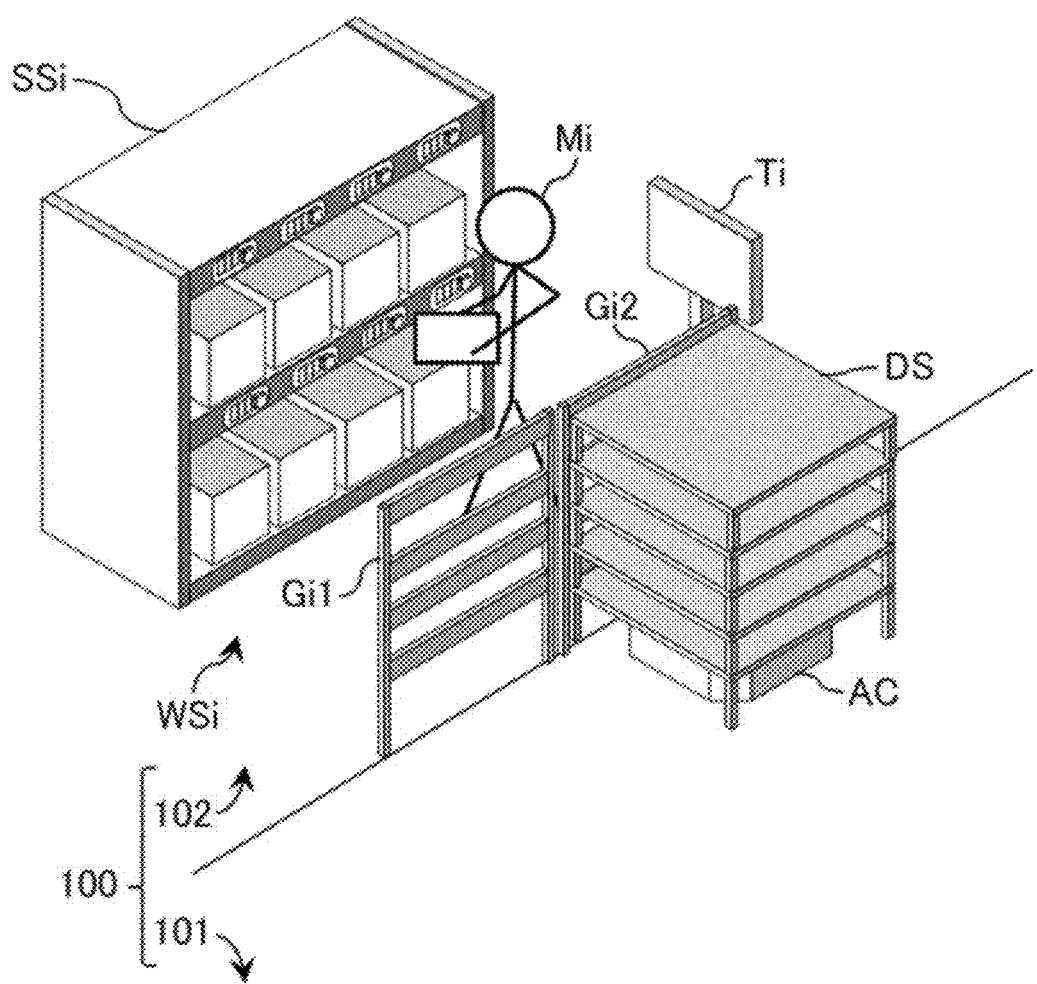
FIG. 2 is an explanatory diagram for explaining specifications of a work station of the carrier system according to the embodiment of the present invention.

FIG. 2 is an explanatory diagram for explaining specifications of the work station WSi of the carrier system according to the embodiment of the present invention.

FIG. 2 illustrates a state in which the storage shelf DS carried by the automatic carrier AC arrives at the work station WSi, and then the worker Mi picks up the article stored in the storage shelf DS through a gate Gi2 to store it into the sorting shelf SSi.

The storing shelf SSi may include a plurality of stages in a vertical direction, and the stages may be sorted in a plurality of columns in a horizontal direction. For example, the worker Mi stores the articles picked up from the storage shelf DS to the respective sections of the sorting shelf SSi in association with each other, in accordance with the list displayed on the terminal Ti. Each of the sections of the sorting shelf SSi is identified by the number of, for example, the stage and the column. Each of the sections may have its identification number displayed thereon. In this case, the worker Mi refers to the displayed number to identify the storage destination. Alternatively, each section may include a display device provided to display whether it is the storage destination of a corresponding article, in each section. In this case, in accordance with the list displayed on the terminal Ti and the progress state of the picking work, the display device of a section as the storage destination of an article to be picked up next is operated, and the worker Mi may store the picked up article by reference to the display.

Articles of only one item may be stored in one storage shelf DS. However, in general, articles of a plurality of items are stored. Specifically, each storage shelf DS has a plurality of storage sections in each of which articles of one item are stored. The storage section is a region which can store articles in the storage shelf DS, and is also referred to as a receptacle. For example, one storage shelf DS may be divided into a plurality of section stages in a vertical direction, and each of the section stages may be further divided into apart close to one side surface of the storage shelf DF and a part close to the other side surface thereof. Further, the divided parts may be divided into a plurality of section columns in a horizontal direction, and each of the section columns may be handled as one storage section.

For example, the inside of the storage shelf DS illustrated in FIG. 2 is divided into four section stages. Each of the section stages may be divided into a part close to a side surface facing the gate Gi2 and a part close to the other side surface, and each part of the shelf may further be divided into a plurality of section columns in a horizontal direction. The parts close to the respective side surfaces of the storage shelf DS may also be identified as shelf surfaces in the following descriptions.

(One Example of Carrier System)

Figure 3:
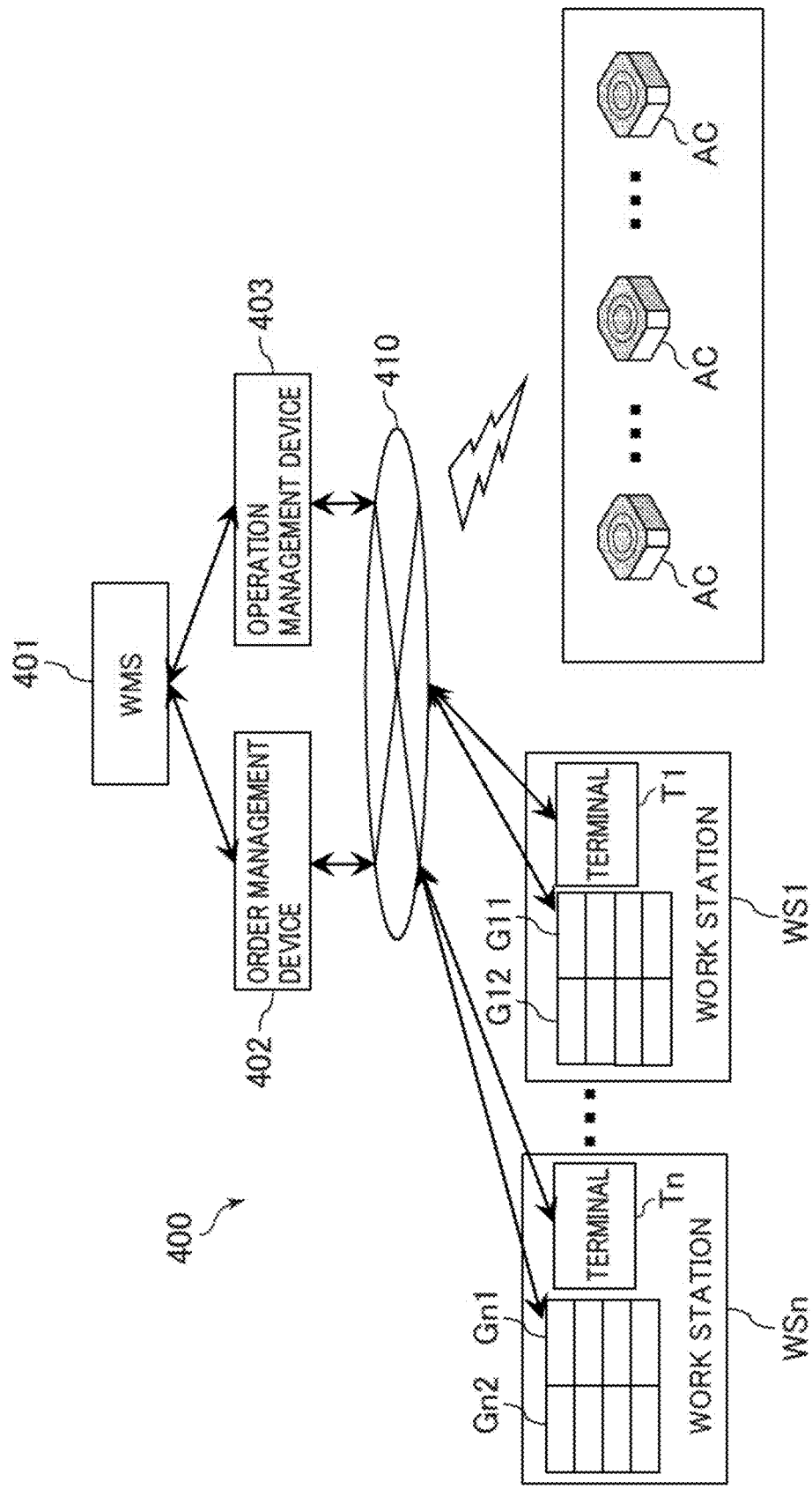
FIG. 3 is a functional block diagram illustrating the entire configuration of the carrier system according to the embodiment of the present invention.

FIG. 3 is a functional block diagram illustrating the entire configuration of the carrier system according to the embodiment of the present invention.

A carrier system 400 has a WMS (Warehouse Management System) 401, an order management device 402, an operation management device (control unit) 403, automatic carriers AC, terminals Ti, a gate control device (not illustrated), and a gate Gij. The WMS 401 is connected with the order management device 402 and the operation management device 403, to carry out communication therebetween. The order management device 402, the operation management device 403, the automatic carriers AC, the terminals Ti, and the gate control device (not illustrated) are connected to communicate with each other through a network 410. The automatic carriers AC are connected with the operation management device 403 for wireless communication through the network 410.

The WMS 401 controls the order management device 402 and the operation management device 403. Specifically, the WMS 401 transmits an order and warehousing data for the storage shelf to the order management device 402. The order is information including an article name of the article to be picked up, the number thereof, and its delivery destination. The warehousing data for the storage shelf is data regarding the storage shelf DS having the articles stored therein. Specifically, the warehousing data for the storage shelf includes identification information regarding, for example, the article name of articles stored in each storage shelf DS, the number thereof, and the storage shelf DS having the corresponding articles stored therein, and also position information of the storage section (receptacle) in which the corresponding article is stored (identification information regarding, for example, the shelf surface to which the storage section belongs, the section stage, and the section column).

The WMS 401 links a process of the order management device 402 with a process of the operation management device 403. Upon reception of completion notification of the picking work for the article by the worker M (see FIG. 1) from the order management device 402, the WMS 401 instructs the operation management device 403 to return the corresponding storage shelf DS to its original position.

The operation management device 403 manages the operation of the automatic carrier AC (for example, carriage of the storage shelf DS using the automatic carrier AC). The automatic carrier AC has a reading device (not illustrated), such as a visible light camera or an infrared ray camera on the bottom of the vehicle body, to scan the floor surface during the movement thereof. For example, when the coordinate marker on the floor surface is a bar code, the reading device is a bar-code reader. At the time of passing through the lattice with the coordinate marker adhered thereto, the reading device scans a bar code representing the coordinate value. Then, the automatic carrier AC acquires the coordinate value. The automatic carrier AC transmits the acquired coordinate value to the operation management device 403. As a result, the operation management device 403 manages the present position of each automatic carrier AC.

When the operation management device 403 receives carrier instruction information of the storage shelf DS from the order management device 402 through the WMS 401, it specifies a storage shelf DS for storing an article to be delivered and a work station WSi having the sorting shelf SSi with a sorting section of the delivery destination of the article to be delivered. Then, it acquires the position of the specified storage shelf DS to generate route information from the position up to the position of the specified work station WSi. At this time, the operation management device 403 transmits route information to a particular automatic carrier AC, for example, an automatic carrier AC closest to the specified storage shelf DS, and instructs it move in accordance with the route information.

Figure 4A:
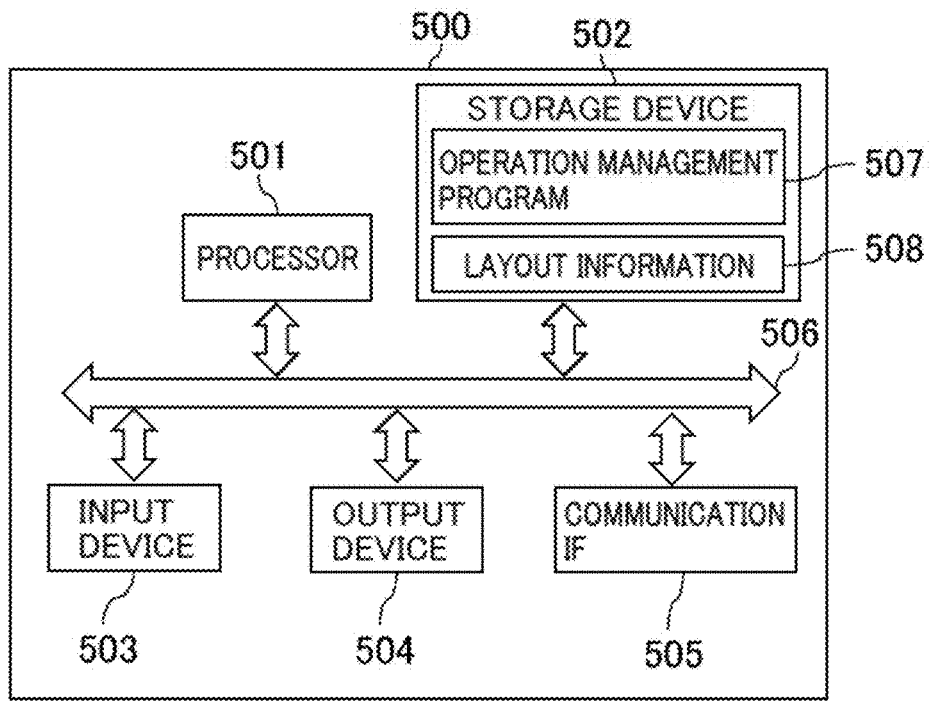
FIGS. 4A and 4B are block diagrams each illustrating a hardware configuration example of an operation management device and an order management device, according to the embodiment of the present invention.
Figure 4B:
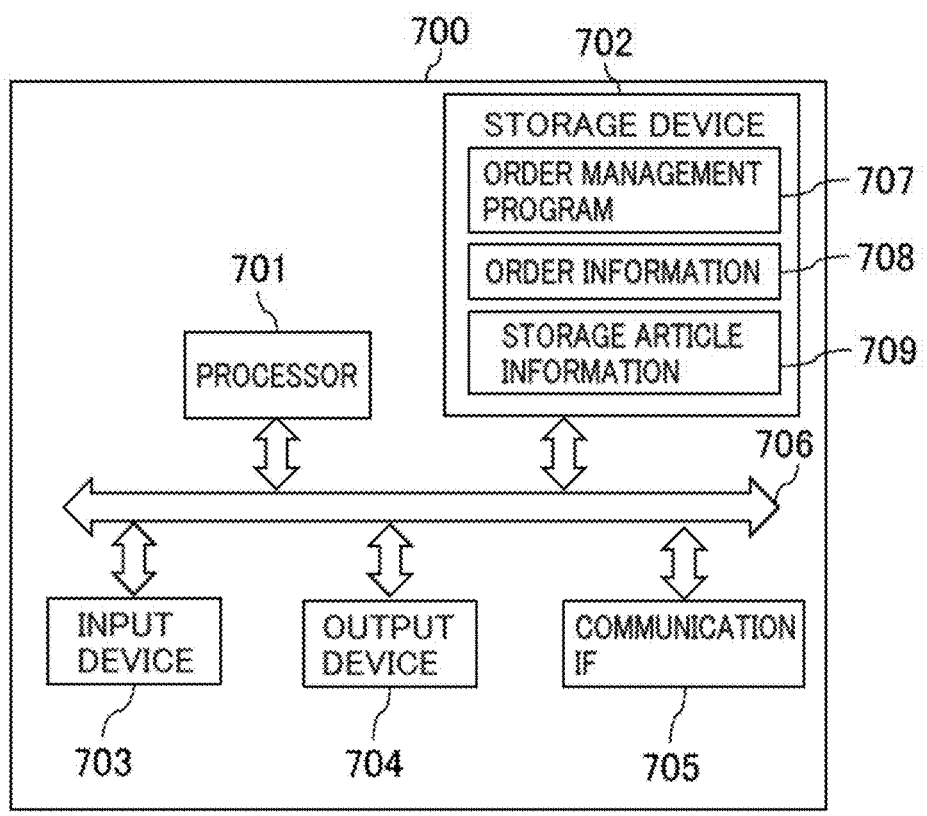

FIG. 4A is a block diagram illustrating a hardware configuration example of the operation management device 403 according to the embodiment of the present invention, and FIG. 4B is a block diagram illustrating a hardware configuration example of the order management device 402 according to the embodiment of the present invention.

The operation management device 403 of this embodiment can be realized by the hardware of a computer 500 illustrated in FIG. 4A. The computer 500 has a processor 501, a storage device 502, an input device 503, an output device 504, and a communication interface (communication IF) 505. The processor 501, the storage device 502, the input device 503, the output device 504, and the communication IF 505 are connected with each other through a bus 506.

The processor 501 controls the computer 500. The storage device 502 is a work area of the processor 501. The storage device 502 is a non-transitory or transitory recording medium which stores various programs and data. The storage device 502 may, for example, be a ROM (Read Only Memory), a RAM (Random Access Memory), an HDD (Hard Disk Drive), and a flash memory.

The storage device 502 of the computer 500 used as the operation management device 403 in this embodiment stores an operation management program 507 and layout information 508. In this embodiment, any of those processes executed by the operation management device 403 is in fact executed by the processor 501 controlling, as needed, the input device 503, the output device 504, and the communication interface 505, in accordance with the operation management program 507.

The layout information 508 includes at least information regarding the arrangement of various objects in the storage area W2. For example, the layout information 508 may include information representing the position of each storage shelf in the storage area W2, the direction of each storage shelf (that is, which storage shelf faces in which direction), articles stored in each of the storage section of each storage shelf, the position of each automatic carrier AC, the position of the gate G, the direction of the gate G, and the route through which the automatic carrier AC lifting up the storage shelf DS can move.

The input device 503 inputs data. The input device 503 may be, for example, a keyboard, a mouse, a touch panel, a numerical keypad, and a scanner. The output device 504 outputs data. The output device 504 may be, for example, a display or a printer. The communication IF 505 is connected to the network 410, and transmits and receives data.

The order management device 402 of this embodiment can be realized by the hardware of a computer 700 illustrated in FIG. 4B. The computer 700 has a processor 701, a storage device 702, an input device 703, an output device 704, and a communication interface (communication IF) 705. The processor 701, the input device 703, the output device 704, and the communication IF 705 are connected with each other through a bus 706.

The processor 701 controls the computer 700. The storage device 702 is a work area of the processor 701. The storage device 702 is a non-transitory or transitory recording medium which stores various programs and data. The storage device 702 may be, for example, a ROM (Read Only Memory), a RAM (Random Access Memory), an HDD (Hard Disk Drive), and a flash memory.

The storage device 702 of the computer 700 used as the order management device 402 of this embodiment stores an order management program 707, order information 708, and storage article information 709. Any of those processes executed by the order management device 402 in this embodiment is executed by the processor 701 controlling, as needed, the input device 703, the output device 704, and the communication interface 705, in accordance with the order management program 707.

The order information 708 includes at least information regarding articles for shipment, warehousing, and shipping, in association with various articles and delivery destinations. For example, the order information 708 may include information representing the type and number of articles to be delivered, the article name, the store name and address of the shipment destination, to perform picking from those articles stored in this system. The information represents the type, the number, and the name of the articles to be warehoused into the storage shelf of this system. The information also represents the shelf ID, the shelf surface, and the receptacle of the storage shelf, to perform the picking for the shipping.

The storage article information 709 includes at least information representing the articles warehoused in the storage shelf of this system. For example, the storage article information 709 may include information representing the type, the name, and the number of warehoused articles, and also the shelf ID, the shelf surface, and the receptacle of the storage shelf corresponding to the storage place of the corresponding article.

The WMS 401 and each terminal Ti can be realized by the above-described computer. Note, however, that the storage device of the computer used as any of the WMS 401 and the terminals Ti stores programs and data necessary for realizing their functions.

(One Example of Correlation Between Shipping Order and Receptacle of Storage Shelf)

FIG. 5 is an explanatory diagram illustrating an example of description contents of shipping orders received from shipment destinations by a WMS 401, according to the embodiment of the present invention.

The shipping order is a combination of an ID of each article, the number of articles, and an ID of a delivery destination. The ID of the article is a name or number representing the kind of the article. In the following descriptions, the article identified by an ID, for example, "A" is also simply referred to as an article "A". The same applies to other articles. The number of articles is the number of articles required (that is, delivered to the delivery destination). The ID of the delivery destination includes the store name of the shipment destination and the name or the number of a collecting place for delivery. In the following descriptions, the delivery destination identified by an ID "SH1" is simply referred to also as a delivery destination SH1, a shipment destination SH1, or a store SH1. The same applies to other delivery destinations.

For example, a shipping order 511 illustrated in FIG. 5 includes a combination of an ID "A" of an article, the number of articles "10", and the ID of the delivery destination "SH1". This represents an order for delivering ten articles "A" to the delivery destination SH1. This combination is one shipping order. FIG. 5 illustrates an example of eleven shipping orders 511 to 521. The WMS 401 receives the shipping orders from the delivery destinations (for example, each store of the shipment destination), and holds them. The order management device 402 acquires the shipping order from the WMS 401, and holds it as order information 708 (see FIG. 8C).

The shipping orders illustrated in FIG. 5 are only example, and may further include any information other than those illustrated. Specifically, as the other information, the shipping order may include the time the shipping order has been received by the WMS 401, the time limit to deliver the article in accordance with the shipping order from the warehouse, and the priority of picking based on the shipping order. For the operation management device 403 to transmit an instruction for carrying a storage shelf scheduled for picking to the automatic carrier AC based on the information of this shipping order, the order management device 402 needs to correlate the shipping order with the receptacle of the storage shelf from which the article described in the shipping order is acquired.

FIG. 6 and FIG. 7 are explanatory diagrams each illustrating a work sequence example of warehousing and shipping of articles, when the article carrier system is applied to a distribution warehouse, according to the embodiment of the present invention.

In the warehousing work, the worker throws the article into the receptacle of the storage shelf. At this time, the warehousing work may include a preparing work before throwing it into the storage shelf, for example, work for attaching a tag to the article or packing the article. For correlation between the shipping order and the receptacle of the storage shelf from which the article is acquired, it is necessary to check a particular storage shelf and receptacle in which a corresponding article exists, at a point of referring to the shipping order.

As an example, FIG. 6 illustrates a work sequence at the time of performing a stock-type warehouse operation in which products exist in the storage shelf even after the shipping work. Regardless of whether the shipping order of a particular operation date is settled, the warehousing of articles to the storage shelf is performed regularly, for example, at a predetermined time period every day or a predetermined day in a week. This results in supplementing the remaining articles in the receptacles.

FIG. 7 illustrates a work sequence when performing a passing-type warehouse operation. In the case of the passing-type warehouse operation, articles are warehoused into the storage shelf every predetermined time period. In this case, the quantity of the articles is that it is required for the shipping work which is performed in the unit of certain operation a day. Thus, the WMS 401 or the order management device 402 accumulates the entire shipping orders which have been received by a predetermined time. Based on this accumulated article information as an operation unit, the quantity of articles to be picked up is warehoused into the receptacle of the storage shelf, in accordance with all shipping orders.

In this manner, for the articles completely warehoused to the receptacle of the storage shelf, the order management device 402 correlates the articles with the shipping order. When warehousing has not been completed yet, and there are no enough remaining articles in the receptacle of the storage shelf for the entire shipping orders, the order management device 402 correlates between the receptacle of the articles and the shipping order, in a range of quantity of available articles which have completely been warehoused at that point. In this case, the additional warehousing work regarding insufficient articles is performed, for example, in a time period until the start of the shipping work or in the same time period as the shipping work. The order management device 402 again performs correlation between the non-correlated shipping order and the receptacle of the storage shelf, in accordance with a result of the additional warehousing work.

The method for correlating between the shipping order and the receptacle of the storage shelf is changed as needed. For example, in the case of different types of workers who perform the picking for the shipping orders or in the case of different work stations WS, in accordance with the kind of articles or shipment destination, the order management device 402 may change the method for correlating between the shipping order and the receptacle of the storage shelf, in accordance with the type of worker who performs picking or the work station WS. As a result, it is possible to suppress a situation in which the same storage shelf is scrambled by a plurality of work stations WS.

In this case, the types of worker may be a classification, for example, in which the worker is a human or a robot, or whether the worker can handle a heavy load. Descriptions will now be made to the example case of human and robot. Each of FIG. 1 and FIG. 2 illustrates a case in which the worker is a human. However, the robot (not illustrated) may be installed in any work station WS, and this robot may perform the picking. Note that the form of the articles that can be picked up by the robot is limited. When the articles ordered from the delivery destination include any article with the form that cannot be picked up by the robot, the picking work for the article delivered to the delivery destination needs to be done by a human worker.

The picking work by the human worker is performed at the work station WS where the human worker is arranged, while the picking work by the robot is performed at the work station WS where the robot is arranged. That is, for two orders, if different types of workers perform the picking in accordance with the orders, it implies that the corresponding picking work is performed at different work stations WS.

In the above example, it is determined whether the picking is performed at the same work station WS in accordance with a plurality of shipping orders, based on the type of worker performing the picking. However, the determination may be made based on any other factor. For example, the delivery destinations are classified into some groups. At this time, it may be possible to determine that the articles for the delivery destinations of the same group are picked up at the same work stations WS, and that the articles for the delivery destinations of different groups are picked up at different work stations WS. For example, when the delivery destinations are stores or shops, the grouping may be performed in accordance with an area to which the location of each store belongs.

FIGS. 8A to 8C are explanatory diagrams illustrating examples of warehousing states and shipping orders of the same products for different two storage shelves, in the embodiment of the present invention. Descriptions will now be made to a system for suppressing a scramble for the storage shelf by reference to FIGS. 8A to 8C.

FIG. 8A illustrates a storage shelf DS1 as one of a plurality of storage shelves DS stored in the storage area W2 illustrated in FIG. 1. Twenty articles A are stored in a receptacle X as one of a plurality of receptacles of the storage shelves DS1.

FIG. 8B illustrates a storage shelf DS2 which differs from the storage shelf DS1, as one of the plurality of storage shelves DS stored in the storage area W2 illustrated in FIG. 1. One hundred articles A are stored in a receptacle Y, as one of a plurality of receptacles of the storage shelf DS1.

FIG. 8C illustrates an example of two shipping orders included in the order information 708. The two shipping orders are identified by order IDs "ODR001" and "ODR002". In the order identified by the order ID "ODR001" (hereinafter, referred to as an order ODR001, and the same applies to other orders), ten articles A are to be delivered to a shipment destination SH1. In the order identified by the order "ODR002", fifteen articles A are to be delivered to a shipment destination SH2.

For example, eleven shipping orders 511 to 521 illustrated in FIG. 5 may be stored as the order information 708. FIG. 8C illustrates two shipping orders 511 and 513 regarding the article A, of the orders.

The article A corresponding to the shipment destination SH1 and the article A corresponding to the shipment SH2, stored in the shipping orders of FIG. 8C, are the same kind (item) of articles. In this embodiment, it is assumed an operation situation that the picking is done at the work stations WS arranged at different locations. In this manner, there are some examples where the picking for the same kind of articles for different shipment destinations is done at different work stations WS. The example cases are: that the kind of articles require special handling; the store chains of the delivery destinations are different; different workers do the work; and different restrictions of delivery time and different shipment priorities due to the consumption time limit are given.

Even when no determination is made at which work stations WS the shipping orders are processed, it can be assumed an operation situation that the picking is settled at least at different work stations WS. In these assumptions, the order management device 402 has a set condition(s) for correlating between different shipping orders and the receptacles of the storage shelve, in accordance with a difference between the above store chains, a difference between the handling workers, and a difference between the shipment priorities.

Figure 9:
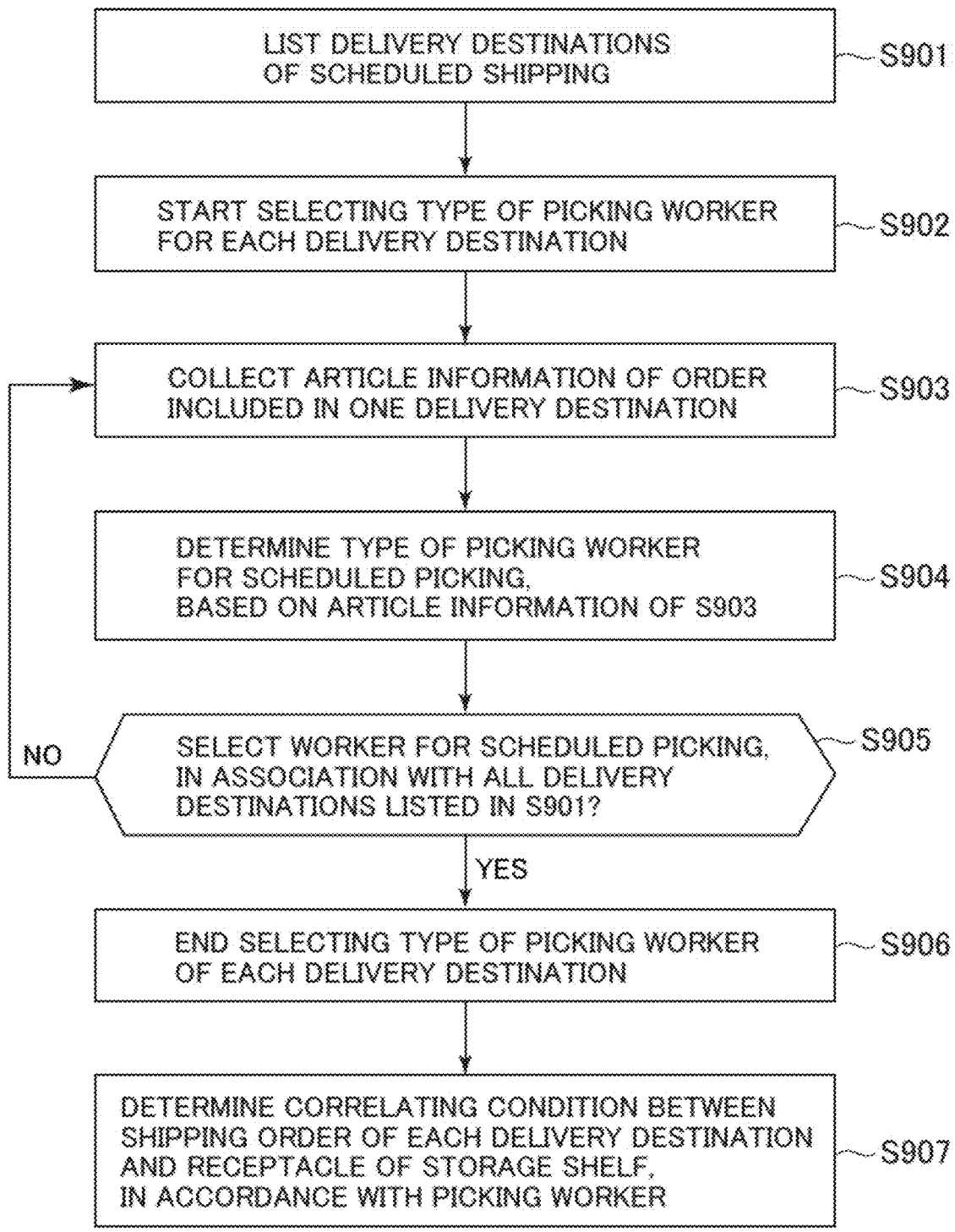
FIG. 9 is a flowchart illustrating a determination process for a condition for correlating between the shipping order and the receptacle of the storage shelf, as executed by the order management device according to the embodiment of the present invention.

FIG. 9 is a flowchart illustrating a determination process for a condition for correlating between the shipping order and the receptacle of the storage shelf, as executed by the order management device 402 according to the embodiment of the present invention.

FIG. 9 illustrates a flow of a process for correlating between different shipping orders and receptacles of the storage shelf, based on a difference of workers, by way of example.

As illustrated in FIG. 6 and FIG. 7, at a timing for correlating between the shipping orders and the receptacles of the storage shelf, the order management device 402 starts the process of FIG. 9. The order management device 402 first makes a list of shipment destinations scheduled for shipping, by reference to the held shipping orders (S901). The order management device 402 starts selecting the type of picking workers, in association with the shipment destinations listed in S901 (S902). Specifically, the order management device 402 checks the kind of articles scheduled for picking based on the shipping order, for a particular shipment destination, of the listed shipment destinations (S903), and searches for the type of worker enabling to pick the entire articles, from the entire scheduled workers (S904).

In this case, the type of worker is classified, for example, as "human" or "robot". Humans can pick up any kind of articles, while it is assumed that there is some kind of article that cannot be picked by the robot due to the form of the articles. The order management device 402 selects a robot as the type of worker, when the entire articles for a particular shipment destination can be picked up by the robot, and selects a human as the type of worker, when some article for the shipment destination cannot be picked up by the robot.

Alternatively, different kinds of articles may be picked up between human workers. For example, some worker can pick up a heavy load, while some cannot. In this case, the types of workers are classified in accordance with the kinds of articles to be picked up. The order management device 402 may select the type of worker who can pick up all articles for a particular shipment destination, in association with shipment destination.

For example, when the order management device 402 holds eleven shipping orders illustrated in FIG. 5, it is necessary to pick up, as articles to be delivered to the shipment destination SH1, ten articles A (shipping order 511), twenty articles B (shipping order 512), and five articles F (shipping order 519). As articles to be delivered to the shipment destination SH2, it is necessary to pick up fifteen articles A (shipping order 513). In this case, for example, when the articles A can be picked up by the robot, and when at least either of the articles B and F cannot be picked up by the robot, "human" is selected as the type of worker for the shipment destination SH1, while "robot" is selected as the type of worker for the shipment destination SH2.

In this case, the picking of the articles for the shipment destination SH1 and the picking of the articles for the shipment destination SH2 are performed at different work stations WS. Because the articles A are included in the articles to be delivered to the shipment destinations SH1 and SH2, if it is intended to pick up the articles A for the shipment destinations from the same storage shelf DS, a scramble for the storage shelf DS may occur between the two work stations WS.

To perform the above process, the order management device 402 needs to hold information representing possible items to be picked up at each work station WS. For example, each shipping order may include information representing the form, the size, and the weight of a corresponding article, in addition to the item and quantity of the article. Alternatively, the storage device 702 of the order management device 402 may hold information representing the item of an article, the form of the article, the size, and the weight thereof, in association with each other. Further, the storage device 702 may include information representing the form, the size, and the weight of possible articles to be picked up by a worker (human or robot) arranged at each work station WS. In this case, the order management device 402 refers to these information pieces to specify a work station WS with a worker who can perform the picking in accordance with each shipping order.

Alternatively, the storage device 702 may include information representing the item of articles directly correlated with the work station WS with a worker who can perform the picking for the articles. In this case, the order management device 402 collates the information with the shipping order, thereby specifying the work station WS where the picking for the shipping order can be performed.

For example, when a plurality of same type of workers exist in a warehouse, it is not possible to specify one work station, even if the type of worker is specified. Even in this case, different types workers are selected for two shipping orders, it is possible to determine that the picking work is performed at different work stations WS, in accordance with the shipping orders.

The order management device 402 repeats the flow of S903 and S904 for the listed shipment destinations (S905), and ends selecting the type of picking worker for each shipment destination (S906). By setting the correlation between the shipping order and the receptacle of the storage shelf in advance in association with the types of workers, it is possible to determine the condition for correlating between the shipping order and the receptacle of the storage shelf for each shipment destination, in accordance with the type of picking worker which is selected in S904 for each shipment destination (S907).

For example, for the shipping orders of FIG. 8C, the order management device 402 determines that the shipping orders for the shipment destination SH1 is in ascending order of the number of remaining articles (that is, in the order from the small number) in the receptacle of the storage shelf, and that the shipping orders for the shipment destination SH2 is in descending order of the number of remaining articles (that is, in the order from the large number) in the receptacle of the storage shelf.

In accordance with this determination for the orders, for the picking of the articles A, the shipping order ODR001 is correlated with a receptacle X of the storage shelf DS1, with the smallest number of remaining articles A and illustrated in FIG. 8A. For the picking of the articles A, the shipping order ODR002 is correlated with a receptacle Y of the storage shelf DS2, with the largest number of remaining articles A and illustrated in FIG. 8B.

The shipping order ODR001 and the shipping order ODR002 are correlated with different receptacles of the storage shelves. Thus, it is possible to suppress a scramble for the same storage shelf, in the picking work at the shipping for both orders. Then, it is possible to suppress a wait time for performing the picking at a particular work station WS, also at another work station. This improve the throughput of the shipping work.

In S907, the order management device 402 may determine a correlating condition including different indexes, for the shipping order corresponding to the picking work at different work stations WS. The order management device 402 may determine a correlating condition based on the number of remaining articles in the receptacle of the storage shelf for the shipping order ODR001, and may determine a correlating condition based on the time limit to perform the shipping for the shipping order ODR002. However, for the shipping order corresponding to the picking work at different work stations WS, there is a determination of a correlating condition defined by the same index (for example, the number of remaining articles in the receptacle of the storage shelf) and the determination methods of different orders (for example, ascending order and descending order). As a result, different storage shelves DS are likely to be assigned to the picking work performed at different work stations WS, and a scramble for the same storage shelve DS is unlikely to occur between the different work stations WS.

FIG. 9 illustrates an example in which the type of the worker is selected for each shipping order based on the type of the worker (that is, to select a work station WS for performing the picking work). However, as described above, it is possible to select a work station for performing the picking work, based on, for example, the group to which the delivery destination belongs. For example, the storage device 702 holds information for correlating between each delivery destination and its belonging group and information for correlating between each group and the work station WS. Based on these information pieces, it is possible to select the work station WS for performing the picking work in accordance with each shipping order.

The condition for correlating between the shipping order and the receptacle of the storage shelf is determined by a combination of some kind of index and a definition of the ordinal relation (that is, the determination method of a correlating order) based on the index. Examples of the index may be an arrival date on which articles are carried to the warehouse, a warehousing date on which articles are thrown into the receptacle of the storage shelf of the article carrier system, the manufacturing date of the articles, the manufacturing lot based on the manufacturing number, the time limit to perform the shipping based on the consumption time limit of the articles, the distance between the storage shelf and the work station WS scheduled for picking (specifically, the real distance, the Manhattan distance, or the distance which is weighted based on the straight time and turning time that the automatic carrier moves), and the number of remaining articles in the receptacle based on the number of remaining articles in the receptacle of the storage shelf.

The ordinal relation based on the index (that is, the determination method of the correlating order) may be defined in ascending order or descending order of the index value, or may be defined in any other method (for example, to correspond to the order in which the intermediate value comes to the top order). In an example, when the number of remaining articles in the receptacle is assumed as the index, the correlating order may be defined in ascending order of the number of remaining articles. In this case, in the example of FIG. 8A, the receptacle X is first correlated with the shipping order. Alternatively, the correlating order may be defined in descending order of the number of remaining articles. In this case, in the example of FIG. 8B, the receptacle Y is first correlated with the shipping order.

Alternatively, as an example of another method other than the ascending order or descending order, the receptacle with the intermediate number of remaining articles may be defined with the highest order. Though not illustrated in FIGS. 8A to 8C, for example, when fifty articles A remain in a receptacle of a storage shelf DS different from the storage shelves DS1 and DS2, this receptacle is first correlated with the shipping order. In this manner, the correlating order is determined based on the index value, thereby enabling to avoid a case in which the receptacle of the same storage shelf is required by a plurality of workers or work stations WS.

As a result of determining the correlating order based on one index value, if the receptacles of a plurality of storage shelves are candidates for correlation with the order, the second and third indexes may be set. At least one of them includes a unique value, for example, the time (a time stamp) or a serial number. As a result, the receptacle can uniquely be determined.

In FIG. 8A and FIG. 8B, when the same number of remaining articles A exist in the receptacle X of the storage shelf DS1 and the receptacle Y of the storage shelf DS2, and when the order of receptacles cannot be determined in accordance with the index based on the remaining numbers thereof, it is possible to uniquely determine the order of the receptacles by setting a plurality of indexes. For example, as the second index, the warehousing time for the articles to the storage shelf is set. In this case, the order of warehousing, that is, whether the warehousing time is late or early, is uniquely determined by comparing the receptacles of all storage shelves. Thus, the order using the index may be set.

When the work station WS or the type of worker has not yet been determined, the order management device 402 counts, for example, the number of times the correlation is performed between the shipping order and the receptacle of the storage shelf, in the unit of shipping orders or the number of stores of the shipment destination. When the counted number reaches a predetermined number, the correlation is determined based on an index different from that used so far or the ordinal relation. This results in changing the receptacle of the storage shelf, to be correlated with the shipping order, in the unit of a predetermined number of shipment destinations. The order management device 402 collects the shipping orders in association with each work station WS and a certain number of shipment destination, thereby suppressing a scramble for the same storage shelf between different work stations WS.

Figure 10:
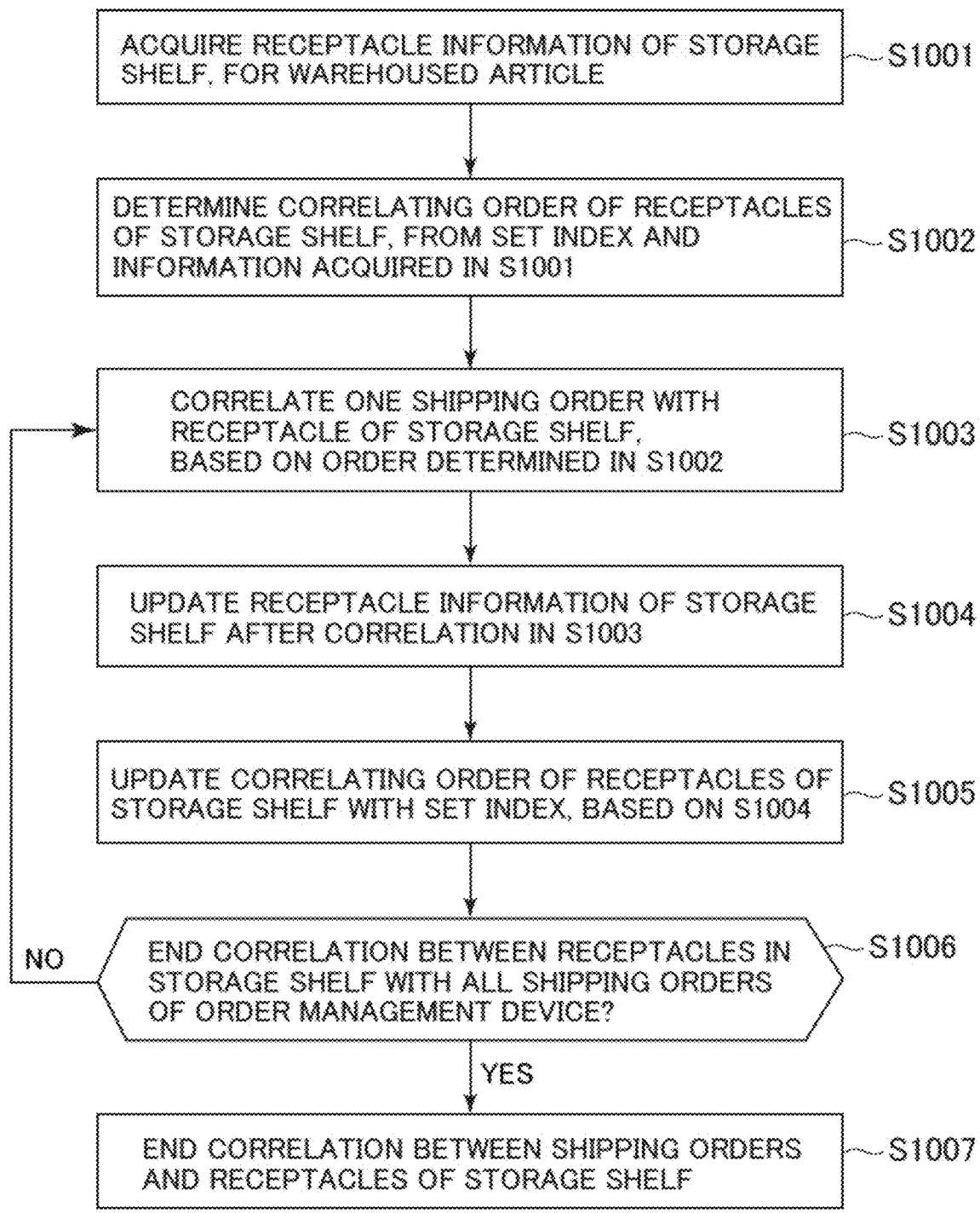
FIG. 10 is a flowchart illustrating a correlation process for correlating between the shipping order and the receptacle of the storage shelf, as executed by the order management device according to the embodiment of the present invention.

FIG. 10 is a flowchart illustrating a correlation process for correlating between the shipping order and the receptacle of the storage shelf, as executed by the order management device 402 according to the embodiment of the present invention.

First, the order management device 402 acquires receptacle information of the storage shelf, in association with the warehoused articles, and stores it in the storage device 702 (S1001). In this case, the receptacle information is information representing the kind (item) of articles and the quantity thereof stored in each receptacle of each storage shelf DS, and is generated based on storage article information 709 (FIG. 4B).

The order management device 402 determines the order of correlating with the receptacle of the storage shelf DS, based on the condition for correlating between the shipping order set in the process of FIG. 9 and the receptacle of the storage shelf and the information acquired in S1001 (S1002).

The order management device 402 correlates between one shipping order held by the order management device 402 and the receptacle of the storage shelf DS, based on the order determined in S1002 (S1003).

The order management device 402 updates the receptacle information of the storage shelf, to reflect the result of correlation performed in S1003 (S1004). Further, the order management device 402 updates the order of correlating between the receptacles of the storage shelfs DS, based on the receptacle information updated in S1004 (S1005).

The order management device 402 determines whether the correlation of the receptacles with the held entire shipping orders has been completed (S1006). When the correlation has not been completed, it returns to S1003, and the correlation is performed between the shipping orders not correlated with the receptacles and the receptacles. When the correlation has been completed, the correlation is completely performed between the shipping orders and the receptacles of the storage shelf (S1007).

As a specific example of the process of FIG. 10, by reference to FIG. 8A to FIG. 9, descriptions will now be made to a process regarding two shipping orders illustrated in FIG. 8C, when the receptacle information illustrated in FIG. 8A and FIG. 8B is acquired in S1001.

As a result of the process of FIG. 9, an "ascending order" of the index "number of remaining articles of receptacles" may be set for the shipping order ODR001, as the determination method for the ordinal relation of correlation between the receptacles. In this case, "1" is given to the receptacle X, and "2" is given to the receptacle Y, as the correlation order of the receptacles based on the determination condition. As a result of the process of FIG. 9, a "descending order" of the index "number of remaining articles of receptacles" may be set for the shipping order ODR002, as the determination method for the ordinal relation of correlation between the receptacles. In this case, "2" is given to the receptacle X, and "1" is given to the receptacle Y (S1002).

In S1003, for example, it is determined that ten articles A corresponding to the shipping order ODR001 are picked up from the receptacle X, based on the order of, for example, "1" of the receptacle X and "2" of the receptacle Y. If this picking is performed, the number of remaining articles A in the receptacle X is reduced from 20 to 10. The receptacle information is updated in a manner to reflect the above (S1004).

In this example, even if the number of remaining articles A in the receptacle X is ten, the ordinal relation with the number of remaining articles A in the receptacle Y is not changed. Thus, there is no need to update the order determined in S1002 (S1005). If the ordinal relation of the number of remaining articles between the receptacles is changed due to this picking, the order determined in S1002 is updated based on the changed ordinal relation. If the number of remaining articles in the receptacle is zero due to the picking, this receptacle is excluded from those targets to which the correlating order is given.

At this point, because the correlation has not been completed between the shipping order ODR002 and the receptacle (S1006: No), this process returns to S1003.

In S1003, it is determined that fifteen articles A corresponding to the shipping order ODR002 are picked up from the receptacle Y, based on the order of, for example, "2" of the receptacle X and "1" of the receptacle Y. If this picking is performed, the number of remaining articles A in the receptacle X is reduced from 100 to 85. The receptacle information is updated in a manner to reflect to the above (S1004).

In this example, even if the number of articles A in the receptacle X is 10, the ordinal relation of the remaining articles A in the receptacle Y is not changed. Thus, there is no need to update the order determined in S1002 (S1005).

Accordingly, the correlation is completed between the two shipping orders illustrated in FIG. 8C (S1006: YES, S1007).

In the above example, the index is the "number of remaining articles of receptacle". However, the same process is possible also for any other indexes. For example, when the index may be the arrival date of articles stored in each receptacle, the warehousing date, the manufacturing date, the manufacturing lot number, or the time limit to perform the shipping, the receptacle information includes the arrival date of articles presently stored in each receptacle, the warehousing date, the manufacturing date, the manufacturing lot number, or the time limit to perform the shipping. The order management device 402 performs the correlation between the shipping order and the receptacle, based on the condition for correlating between the shipping order and the receptacle of the storage shelf and also the receptacle information.

When the index is the distance between the storage position of the storage shelf DS and the work station WS, the order management device 402 holds information representing the positional relationship of each storage shelf and each work station WS, and correlates between the shipping order and the receptacle, based on the held information and the condition for correlating between the shipping order and the receptacle of the storage shelf. In this case, the information representing the positional relationship of each storage shelf and each work station WS may be information with which the distance from the storage position of each storage shelf up to the position of each work station WS can be acquired. For example, information representing the positional relationship may be information representing the distance itself from the storage position of each storage shelf up to the position of each work station WS, or may be map information of the warehouse (or factory) which includes the storage position of each storage shelf and the position of each work station WS.

By this correlation, it is possible to perform simultaneously the picking based on the shipping order ODR001 and the picking based on the shipping order ODR002, respectively at different work stations WS. This results in preventing a scramble for the storage shelf DS, and improving the throughput of the picking work.

Accordingly, the article carrier system according to this embodiment of the present invention has a plurality of storage shelves (for example, the storage shelves DS) having articles stored therein and an order management unit (for example, the order management device 402) managing a plurality of orders (for example, the shipping orders 511 to 521) for shipping articles. The order management unit holds receptacle information including at least information regarding the quantity of the articles stored in each receptacle of each storage shelf. The order management unit determines that different conditions are provided for orders for performing the picking at different workplaces (for example, work station WS), as conditions for correlating between each order and the receptacle for picking in accordance with each order (for example, S1002 of FIG. 10), and determines the storage shelf to be carried in association with each order, based on the determined conditions and the receptacle information (for example, S1003 of FIG. 10).

In this manner, different storage shelves are correlated with the order for performing the picking at different workplaces. Thus, it is possible to reduce a wait time which is generated due the scramble for the same storage shelf at different workplaces, and to improve the throughput of the picking work of the system, for the shipping order.

The above-described condition is defined by the predetermined condition and the determination method of the order for correlating between the order and the receptacle based on the value of the index. The order management unit may determine different conditions which are defined by the same index and the different determination methods of the order, for at least the two orders for performing the picking at different workplaces.

The receptacle information may include information regarding the time limit to perform the shipping of the articles stored in receptacle, and the index may be the time limit to perform the shipping of the articles stored in each receptacle.

Alternatively, the index may be the quantity of articles stored in each receptacle.

Alternatively, the receptacle information may include information regarding the arrival date that the articles stored in each receptacle have arrived at the warehouse having the storage shelves or the date on which the articles have been warehoused in each receptacle, and the index may be the date on which the articles stored in each receptacle have arrived at the warehouse having the storage shelves or the date on which the articles have been warehoused in each receptacle.

Alternatively, the receptacle information may include information regarding the manufacturing date or lot number of articles stored in each receptacle, and the index may be the manufacturing date or lot number of the articles stored in each receptacle.

Alternatively, the article carrier system may further hold information representing the positional relationship between the storage position of each storage shelf and each workplace, and the index may be the distance between the storage position of each storage shelf including the receptacles and each workplace.

As a result of the above, the correlation can easily be made between different receptacles and orders for performing the picking at different workplaces, and it reduces the wait time generated due to the scramble for the same storage shelf at different workplaces.

The determination method for the order for correlating between the order and the receptacle based on the value of the index may be any of a method for determining the order in which the smallest value of the index comes to the top order (that is, ascending order), a method for determining the order in which the largest value of the index comes to the top order (that is, descending order), or a method for determining the order in which the value of the index close to a predetermined value greater than the smallest value and smaller than the largest value comes to the top order. In this case, when the index is the time limit to perform the shipment, the arrival date of articles, the warehousing date of articles, or the manufacturing date of articles, the early date may be used as the value of the small index, while the late date may be used as the value of the large index.

As a result, the correlation may easily be made between different receptacles and the orders for performing the picking at different workplaces, and it reduces the wait time generated due the scramble for the same storage shelf at different workplaces.

The article carrier system further has a carrier (for example, a carrier AC) which carries the storage shelf and a carrier control unit (for example, the operation management device 403) which controls the carrier. The carrier control unit may control the carrier in a manner to carry the storage shelf determined as a target to be carried by the order management unit to a workplace for picking the articles stored in the receptacle of the storage shelf.

The storage shelves determined as described above to the respective workplaces are carried to the respective workplaces, thereby reducing the wait time generated due to the scramble for the same storage shelf at different workplaces.

For example, as illustrated in FIG. 5, each order includes information representing the article item, the quantity, and the delivery destination of the article to be shipped. The order management unit holds information representing the possible articles to be picked up at each workplace, and may determine the workplace in which all articles of the items to be delivered to the same delivery destination can be picked up, as a workplace for picking for the order regarding all the articles of the items to be delivered to the same delivery destination.

For example, in accordance with the process illustrated in FIG. 9, the order management unit may determine a workplace in which a robot performs the picking as a workplace for performing the picking all orders regarding a particular delivery destination, when all the articles of items to be delivered to the delivery destination can be picked up by the robot. When at least one article of an item to be delivered to a particular delivery destination cannot be picked up by the robot, it is possible to determine a workplace in which the human performs the picking as the workplace in which the picking of all orders regarding the delivery destination is performed.

As a result, the orders and the workplaces are appropriately correlated with each other, and it is possible to prevent a scramble for the same storage shelf by correlating different receptacles with orders of different workplaces.

The present invention is not limited to the above embodiment, and various modifications are included. For example, the above-described embodiment has been described specifically for better understanding of the present invention, and is not limited to any of those unnecessarily including all the described configurations.

A part or entire of the above-described configuration, function, processing unit, and processing means may be realized by the hardware, that is, by designing it with an integrated circuit, for example. Each of the above-described configuration and the function may be realized by the processor analyzing the program realizing and executing the functions, using the software. Information of the programs, tables, and files for realizing the function may be stored in a memory device, such as a non-volatile semiconductor memory, a hard disk drive, or an SSD (Solid State Drive), or on a computer readable non-transitory data memory medium, such as an IC card, an SD card, or a DVD.

The control line and the information line which are considered necessary for better understanding have been described. It is not limited that all the control lines and information lines have been described. In fact, it can be considered that almost all configurations are mutually connected with each other.

What is claimed is:

1. An article carrier system comprising:
   a plurality of storage shelves in which an article is stored; and
   an order management unit which manages a plurality of orders for shipping the article,
   a carrier which carries the storage shelf, and
   a carrier control unit which controls the carrier, wherein
      the carrier control unit controls the carrier to carry the storage shelf which has been determined by the order management unit, as a target to be carried, to the workplace for performing picking of the article stored in the receptacle of the storage shelf, and
   the order management unit
      holds receptacle information which includes at least information representing a quantity of articles stored in each receptacle of each of the storage shelves,
      determines to provide different conditions for orders for which picking is performed at different workplaces, as conditions for correlating between each of the orders and the receptacle for performing picking in accordance with each order, and determines a storage shelf to be carried to the workplace for performing the picking in association with each of the orders, based on the determined condition and the receptacle information.

2. The article carrier system according to claim 1, wherein the condition is defined by a predetermined index and a determination method for an ordinal relation for correlating between the order and the receptacle based on a value of the index, and the order management unit determines different conditions defined by same indexes as the index and a determination method for a different ordinal relation, for at least two orders for which picking is performed at the different workplaces.

3. The article carrier system according to claim 2, wherein the receptacle information includes information regarding a time limit for shipping the article stored in each receptacle, and the index is the time limit for shipping the article stored in each receptacle.

4. The article carrier system according to claim 2, wherein the index is a quantity of articles stored in each receptacle.

5. The article carrier system according to claim 2, wherein the receptacle information includes information regarding a date on which the article stored in each receptacle has arrived at a warehouse having each of the storage shelves or a date on which the article has been warehoused in each receptacle, and the index is a date on which the article stored in each receptacle has arrived at each storage shelf or a date on which the article has been warehoused in each receptacle.

6. The article carrier system according to claim 2, wherein the receptacle information includes information regarding a manufacturing date or a lot number of an article stored in each receptacle, and the index is the manufacturing date or the lot number of the article stored in each receptacle.

7. The article carrier system according to claim 2, further comprising information representing a positional relationship between a storage position of each storage shelf and each workplace, wherein the index is a distance between the storage position of each storage shelf having each receptacle and each workplace.

8. The article carrier system according to claim 2, wherein the determination method for an ordinal relation for correlating between the order and the receptacle based on a value of the index is any of a method for determining an ordinal relation in which a small value of the index comes to a top order, a method for determining an ordinal relation in which a large value of the index comes to the top order, or a method for determining an ordinal relation in which a value of the index close to a predetermined value greater than a smallest value and smaller than a largest value comes to the top order.

9. The article carrier system according to claim 1, wherein the order includes information representing an article of an item to be shipped, its quantity, and its delivery destination, and the order management unit holds information representing an article of an item which can be picked up at each of the workplaces, and determines the workplace in which picking can be performed for articles of all items to be delivered to a same delivery destination, as a workplace for performing picking of orders regarding the articles of all items to be delivered to the same delivery destination.

10. An order management device which manages a plurality of orders for shipping articles stored in a plurality of storage shelves, comprising a processor and a storage device to which the processes accesses, wherein the storage device holds receptacle information including at least information regarding a quantity of articles stored in each receptacle of each of the storage shelves, the processor determines to provide different conditions for orders for performing picking at different workplaces, as conditions for correlating each order for shipping articles and the receptacle for performing picking in accordance with the order, and determines a storage shelf to be carried to the workplace for performing picking in association with each order, based on the determined conditions and the receptacle information, the condition is defined by a predetermined index and a determination method for an ordinal relation for correlating between the order and the receptacle based on a value of the index, and the order management unit determines different conditions defined by same indexes as the index and a determination method for a different ordinal relation, for at least two orders for which picking is performed at the different workplaces.

11. A method for controlling an article carrier system having a plurality of storage shelves on which articles are mounted and an order management unit which manages a plurality of orders for shipping the articles and holds receptacle information including at least information regarding a quantity of articles stored in each receptacle of each of the storage shelves, the method comprising the steps of:

determining to provide different conditions for orders for performing picking at different workplaces, as conditions for correlating between each of the orders and the receptacle for performing the picking in accordance with each order, by the order management unit; and determining a storage shelf to be carried to the workplace for performing the picking in association with each order, based on the determined conditions and the receptacle information, by the order management unit, wherein the condition is defined by a predetermined index and a determination method for an ordinal relation for correlating between the order and the receptacle based on a value of the index, and the order management unit determines different conditions defined by same indexes as the index and a determination method for a different ordinal relation, for at least two orders for which picking is performed at the different workplaces.

* * * * *